United States Patent
Lee (10) Patent No.: US 8,470,256 B2
(45) Date of Patent: Jun. 25, 2013

(54) DEVICE FOR SORTING CARBON NANOTUBES

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 13/495,266

(22) Filed: Jun. 13, 2012

(65) Prior Publication Data

US 2012/0251396 A1    Oct. 4, 2012

Related U.S. Application Data

(62) Division of application No. 12/620,761, filed on Nov. 18, 2009, now Pat. No. 8,221,592.

(51) Int. Cl.
  *B01J 19/12* (2006.01)
  *B01J 19/08* (2006.01)
  *B82Y 40/00* (2011.01)

(52) U.S. Cl.
  USPC ........ 422/186.3; 422/186; 422/119; 977/845; 977/901

(58) Field of Classification Search
  USPC ................ 422/186.3, 186, 119; 977/845, 901
  See application file for complete search history.

(56) References Cited

U.S. PATENT DOCUMENTS

| | | | |
|---|---|---|---|
| 6,613,486 B1 * | 9/2003 | Shimizu et al. ............ | 422/186.3 |
| 7,247,670 B2 | 7/2007 | Malenfant et al. | |
| 7,421,003 B2 | 9/2008 | Ubukata et al. | |
| 7,553,525 B2 | 6/2009 | Sawatari et al. | |
| 2003/0219889 A1 | 11/2003 | Sumaru et al. | |
| 2007/0258880 A1 | 11/2007 | Murakoshi | |
| 2009/0286308 A1 | 11/2009 | Berthelot et al. | |
| 2010/0027118 A1 | 2/2010 | Rosenman et al. | |
| 2010/0166637 A1 | 7/2010 | Ziegler | |
| 2011/0114471 A1 | 5/2011 | Lee | |
| 2012/0217151 A1 * | 8/2012 | Matsuzawa et al. ..... | 204/157.15 |

OTHER PUBLICATIONS

Suda et al, "Photoswitchable Magnetic Layer-by-Layer Films Consisting of Azobenzene Derivatives and Iron Oxide Nanoparticles," Chemistry Letters vol. 34, No. 7 (2005), pp. 1028-1029.*

Lim et al, "Photoreversibly Switchable Superhydrophobic Surface with Erasable and Rewritable Pattern," Journal of the American Chemical Society, vol. 128, No. 45, pp. 14458-14459 (2006).*

"Synthesis and Photoisomerization Characteristics of a 2,4,4'-Substituted Azobenzene Tethered to the Side Chains of Polymethacrylamide," Macromolecules, vol. 39, pp. 3217-3223 (2006).*

Serwadczak et al, "Photochromic Gratings in Sol-Gel Hybrid Materials Containing Cyanoazobenzene Chromophores," J. of Sol-Gel Science & Technology, vol. 37, pp. 57-62 (2006).*

(Continued)

*Primary Examiner* — Keith Hendricks
*Assistant Examiner* — Colleen M Raphael
(74) *Attorney, Agent, or Firm* — Workman Nydegger (57) ABSTRACT

A method for sorting carbon nanotubes (CNTs) is disclosed. In one embodiment, a method for sorting CNTs of the present disclosure comprises providing to a surface of a substrate, the surface modified with a trans isomer of photo-isomerization-reactive diazo compound, a dispersion containing a mixture of conducting CNTs and semiconducting CNTs; removing CNTs which are not associated with the modified surface from the surface; and irradiating the modified surface to detach the CNTs associated with the modified surface.

18 Claims, 3 Drawing Sheets

OTHER PUBLICATIONS

Que et al, "Photo-responsive properties and heating-induced surface relief patterns from azobenzene-doped $GeO_2/\gamma$-glycidoxyproplytrimethoxysilane organic-inorganic hybrid films," Optics Express, May 28, 2007, vol. 15, No. 11, pp. 6868-6873.*

Wolf et al, "Reversible molecular switching at a metal surface: A case study of tetra-tert-butyl-azobenzene on Au(111)," Surface Science, vol. 603 (2009), pp. 1506-1517.*

Melburne C. LeMieux, et al "Self-Sorted, Aligned Nanotube Networks for Thin-Film Transistors" Science, vol. 321, No. 101, Jul. 4, 2008, pp. 101-104.

Oleh M. Tanchak et al., "Light-Induced Reversible Volume Changes in Thin Films of Azo Polymers: The Photomechanical Effect", Macromolecules 2005, 38, Jul. 18, 2005, 10566-10570, Department of Chemistry, McGill University, Montreal, Quebec, Canada H3A 2K6.

Hongyan Jiang et al., "Polymers Move in Response to Light", Adv. Mater. 2006, 18, Oct. 21, 2005, 1471-1475, 2006 Wiley-VCH Verlag GmbH & Co. KGaA, Weinheim.

Robert F. Service "Tiny Transistor Gets a Good Sorting Out", Science vol. 321, July 4, 2008, AAAS.

Birch, H., "A New Spin on Sorting Nanotubes," Royal Society of Chemistry, Chemistry World, News, 2008, Retrieved on Jan. 11, 2011, Retrieved from the Internet: <URL: http://www.rsc.org/chemistryworld/News/2008/July/03070801.asp>, Published on Jul. 14, 2008 as per Wayback Machine.

Bao, Z, "Self-Sorting of Metallic Carbon Nanotubes for High Performance Large Area Low Cost Transparent Electrodes," Stanford University, Global Climate & Energy Project, Retrieved on Jan. 11, 2011, Retrieved from the Internet: <URL: http://gcep.stanford.edu/research/factsheets/metallicnanotubes.html>, Published Jul. 13, 2009 as per Google.

Berger, M., "Carbon Nanotube Sorting with DNA," Nanowerk LLC., Retrieved on Jan. 21, 2011, Retrieved from the Internet: <URL: http://www.nanowerk.com/spotlight/spotid=7268.php>, Published on Sep. 16, 2008 as per Google.

International Search Report and Written Opinion from International Application No. PCT/KR2010/007781 dated Jan. 26, 2011.

Wang et al, "Tuning the Amphiphilicity of Building Blocks: Controlled Self-Assembly and Disassembly for Functional Supramolecular Materials," Advanced Materials, vol. 21, pp. 2849-2864, Wiley-VCH GmbH & Co., published online Jun. 2, 2009.

Liu et al., "Tandem extraction strategy for separation of metallic and semiconducting SWCNTs using condensed benzenoid molecules: effects of molecular morphology and solvent," Physical Chemistry Chemical Physics, vol. 11, pp. 7257-7267, published online Jun. 10, 2009.

Koumura, N., et al., "Light-Driven Molecular Rotor: Unidirectional Rotation Controlled by a Single Stereogenic Center," Journal of the American Chemical Society, 2000, pp. 12005-12006, vol. 122, No. 48, Copyright American Chemical Society, published on web Nov. 11, 2000.

U.S. Appl. No. 12/620,761, Dec. 19, 2011, Notice of Allowance.
U.S. Appl. No. 12/620,761, Mar. 15, 2012, Notice of Allowance.

* cited by examiner

DEVICE FOR SORTING CARBON NANOTUBES

CROSS-REFERENCE TO RELATED APPLICATIONS

This application is a division of U.S. application Ser. No. 12/620,761 filed on 18 Nov. 2009, the contents of which are incorporated herein, in their entirety, by this reference.

BACKGROUND

Various properties of carbon nanotubes (CNTs), such as their strength and electrical properties, make them potentially useful in many applications in nanotechnology, electronics, optics and other fields of materials science. Further, CNTs have been suggested as drug carriers, hyperthermia agents for killing cancer cells, and fluorescent moieties for biosensing.

Depending on electronic properties, CNTs can be divided into semiconducting CNTs and conducting CNTs. For a specific purpose, either semiconducting CNTs or conducting CNTs can be selectively used. Accordingly, improvements in sorting semiconducting CNTs from conducting CNTs or vise versa would be beneficial.

SUMMARY

In one aspect, a method for sorting carbon nanotubes (CNTs) includes providing to a surface of a substrate, the surface modified with a trans isomer of photo-isomerization-reactive diazo compound, a dispersion containing a mixture of conducting CNTs and semiconducting CNTs; removing CNTs which are not associated with the modified surface from the surface; and irradiating the modified surface to detach the CNTs associated with the modified surface.

In another aspect, a device for CNTs sorting includes a surface-modified substrate including a substrate and a photo-isomerization-reactive diazo compound layer. Conducting enriched CNTs or semiconducting enriched CNTs are associated with the surface modified with a trans isomer of the photo-isomerization-reactive diazo compound. The device further includes a radiating device associated with the surface-modified substrate and configured to provide electromagnetic radiation suitable to detach the associated CNTs from the modified surface.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The present disclosure provides a method for sorting carbon nanotubes (CNTs).

In one embodiment, a method for sorting carbon nanotubes (CNTs) of the present disclosure includes providing to a surface of a substrate, the surface modified with a trans isomer of photo-isomerization-reactive diazo compound, a dispersion containing a mixture of conducting CNTs and semiconducting CNTs; removing CNTs which are not associated with the modified surface from the surface; and irradiating the modified surface to detach the CNTs associated with the modified surface.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein the term "conducting CNTs" refer to CNTs having electronic properties akin to a conductor, and the term "semiconducting CNTs" refer to CNTs having electronic properties akin to a semiconductor. In some embodiments, a dispersion containing a mixture of semiconducting CNTs and conducting CNTs is provided to a surface of a substrate modified with a trans isomer of photo-isomerization-reactive diazo compound. A solvent of the CNT dispersion can include, but not limited to, water, an organic solvent such as alcohols, ethers, or ketones, or mixture thereof.

In the present disclosure, a mixture in which an amount of conducting CNTs is greater than 50 percent by weight in the total weight of the CNT mixture is referred as conducting enriched CNTs. A mixture in which an amount of semiconducting CNTs is greater than 50 percent by weight in the total weight of the CNT mixture is referred as semiconducting enriched CNTs. In some embodiments, conducting or semiconducting enriched CNTs may include greater than approximately 50 percent, greater than or equal to approximately 60 percent, greater than or equal to approximately 75 percent, greater than or equal to approximately 90 percent, greater than or equal to approximately 95 percent, greater than or equal to approximately 99 percent by weight of conducting CNTs or semiconducting CNTs, respectively. In another embodiment, conducting or semiconducting enriched CNTs may include 70 to 100 percent by weight, or 90 to 100 percent by weight of conducting CNTs or semiconducting CNTs, respectively.

As used herein the term "surface" refers to the surface of a substrate on which the mixture containing semiconducting and conducting CNTs are provided and a sorting of these CNTs are performed. The substrate can have various shapes and sizes. The shape of the substrate can include, but is not limited to, a square, a rectangle, a circle or an oval shape. The size of the substrate can vary depending on the amount of CNTs to be sorted. The substrate can include, but is not limited to, Si, Au, Ni, Cr, Cu, Al, Pt, Ti, W, Pd, Mo, metal oxides such as ITO (Indium Tin Oxide), or glass. The surface is modified with a trans isomer of a photo-isomerization-reactive diazo compound.

As disclosed herein "providing to a surface of a substrate a dispersion containing a mixture of conducting CNTs and semiconducting CNTs" refers to "adding to the surface of the substrate the dispersion", "pouring to the surface of the substrate the dispersion", "immersing the surface of the substrate in the dispersion", "soaking the surface of the substrate in the dispersion", "supplying to the surface of the substrate the dispersion", or "furnishing to the surface of the substrate the dispersion".

As disclosed herein the term "a photo-isomerization-reactive diazo compound" refers to a diazo compound which generates a photo-isomerization reaction by light irradiation. Here, the photo-isomerization reaction means a phenomenon that a single compound is changed into some other isomer by the irradiation thereof with light. The photo-isomerization reaction can be the cis-trans isomerization reaction.

The photo-isomerization-reactive diazo compound includes, but is not limited to, an aryl-terminated photo-isomerization-reactive diazo compound or an amine-terminated photo-isomerization-reactive diazo compound. The examples of the photo-isomerization-reactive diazo compound and preparation methods thereof are well-known in the field of the art. By way of examples, U.S. Pat. Nos. 7,421,003 and 7,553,525 disclose the photo-isomerization-reactive diazo compound and preparation methods, which are incorporated herein by references in their entireties.

Specific example of an aryl-terminated photo-isomerization-reactive diazo compound can include, but is not limited to, a compound having in the molecule thereof a skeleton represented by the following chemical formula (I) at one of the terminal ends thereof:

$$—Ar^1—N=N—Ar^2 \qquad (I)$$

wherein, $Ar^1$ and $Ar^2$ may be the same or different, and independently represent a substituted or unsubstituted aryl group. An aryl group includes, but is not limited to, a phenyl, phenoxy, naphthyl, naphthoxy, fluorenyl, phenylthio, or naphthylthio group. An aryl group may be substituted by a $C_{1-5}$ alkyl group, a $C_{1-5}$ alkoxy group, a $C_{1-5}$ carboxy group, a $C_{1-5}$ alkoxy $C_{1-5}$ carbonyl group, a cyano group, a sulfo group, or a hydroxy group.

Specific examples of the aryl-terminated photo-isomerization-reactive diazo compound include a compound having in the molecule thereof an azobenzene skeleton represented by the following chemical formula (II) at one of the terminal ends thereof:

(II)

When the azobenzene skeleton is irradiated with UV energy ($\lambda_1$), a trans isomer of the azobenzene skeleton, as shown in the below Chemical Reaction (1), is changed to the cis isomer thereof. Since the cis isomer of the azobenzene skeleton is more chemically unstable than trans isomer thereof; the cis isomer absorbs visible energy ($\lambda_2$) to returns thereto.

(1)

Trans isomer      Cis Isomer

Specific example of an amine-terminated photo-isomerization-reactive diazo compound can include, but is not limited to, a compound having in the molecule thereof a skeleton represented by the following chemical formula (III) at one of the terminal ends thereof:

$$—Ar^1—N=N—Ar^2—[(CH_2)_p—N—R^1R^2]_q \qquad (III)$$

wherein, $Ar^1$ and $Ar^2$ are same as the above. $R^1$ and $R^2$ may be the same or different, and independently represent a hydrogen atom or a $C_{1-5}$ alkyl group. p represents an integer of 0-5, and q represents an integer of 1-5.

In some embodiments, $R^1$ and $R^2$ can be a hydrogen atom, p represents an integer of 0-5, and q represents an integer of 1-5 in the above chemical formula (III). In another embodiment, $R^1$ and $R^2$ can be a hydrogen atom, p represents an integer of 0-2, and q represents an integer of 1-5 in the above chemical formula (III). In still another embodiment, $R^1$ and $R^2$ can be a hydrogen atom, p represents 0 or 1, and n represents 1 in the above chemical formula (III).

The photo-isomerization reaction mechanism of an amine-terminated photo-isomerization-reactive diazo compound is the same as that of an aryl-terminated photo-isomerization-reactive diazo compound.

A surface of a substrate on which a mixture containing semiconducting and conducting CNTs are provided and a sorting of these CNTs are performed, is modified with the above photo-isomerization-reactive diazo compound. The surface is at least partially coated with a coating solution in which the above-mentioned photo-isomerization-reactive diazo compound is diluted with an organic solvent, and then the solution is dried. The organic solvent can include, but is not limited to, alcohols, ethers, ketones, or acetonitrile. In some embodiments, the content of the photo-isomerization-reactive diazo compound in the coating solution is approximately 0.05 to 10 percent by weight. In another embodiment, the content of the photo-isomerization-reactive diazo compound is approximately 0.2 to 5 percent by weight, approximately 0.5 to 3 percent by weight, or approximately 0.5 to 1 percent by weight. If the content becomes larger than approximately 0.05 percent by weight, the probability that CNTs are associated to the photo-isomerization-reactive diazo compound will increase. As a result, the efficiency of the CNT sorting will increase more. Conversely, if the content becomes smaller than approximately 10 percent by weight, the viscosity of the coating solution becomes lower such that a homogeneous diazo compound layer is easily formed.

The coating method which can be used is dip coating, spin coating, roll coating, rod bar coating, spray coating, air knife coating, slot die coating, wire bar coating or the like. Coating conditions, such as volume or rate, can be controlled so that nearly the same density of the diazo compound is absorbed throughout the surface.

The thickness of the layer obtained by coating with the photo-isomerization-reactive diazo compound can be approximately 0.1 to 30 nm. In some embodiments, the thickness is approximately 0.1 to 15 nm, approximately 0.1 to 10 nm, or approximately 0.5 to 10 nm.

The layer obtained by coating with the photo-isomerization-reactive diazo compound may be a monolayer or a submonolayer similar to the monolayer. As used herein, such layer is referred as a diazo compound monolayer or submonolayer. The diazo compound monolayer or submonolayer may have an amine group or aryl group at a terminal end, which can contact directly with CNTs. As a result, a CNT sorting, which will be described in detail hereinafter, can be, effectively performed.

The diazo compound monolayer or submonolayer may be formed by adding $(RO)_3Si-$ or $HS-$ at a terminal end opposite to the amine or aryl terminal end of the photo-isomerization-reactive diazo compound; and attaching to the substrate the $(RO)_3Si-$ or $HS-$ terminal end. In the above $(RO)_3Si-$ terminal group, R represents a substituted or unsubstituted alkyl group. In some embodiment, R can be a $C_{1-5}$ alkyl group. In another embodiment, the alkyl group may be substituted by a $C_{1-5}$ alkyl group, a $C_{1-5}$ alkoxy group, a $C_{1-5}$ carboxy group, a $C_{1-5}$ alkoxy $C_{1-5}$ carbonyl group, a cyano group, a sulfo group, or a hydroxy group.

If one of the terminal ends of the photo-isomerization-reactive diazo compound is $(RO)_3Si-$, the terminal end is fixed in the form of $(-O)_3Si$ on the substrate including Si, glass or metal oxides, such as ITO. As a result, the substrate is coated with the photo-isomerization-reactive diazo compound, and, thus, the diazo compound monolayer can be formed on the substrate. In another example, if one of the terminal ends of the photo-isomerization-reactive diazo compound is $HS-$, the terminal end can be fixed in the form of $-S-$ on the substrate including metal, such as Au. As a result, the substrate is coated with the photo-isomerization-reactive diazo compound, and, thus, the diazo compound monolayer can be coated.

CNTs have high affinity for terminal aryl groups or terminal amine groups of photo-isomerization-reactive diazo compounds of a surface of a substrate. Accordingly, in order to efficiently perform the CNT sorting by use of the selective association between CNTs and terminal ends, the average alignment direction of a trans isomer of the skeleton represented by the above chemical formula (I) or (III) should be perpendicular to the substrate. The method for forming photo-isomerization-reactive diazo compounds layer on the surface of a substrate to have the foregoing alignment direction is well-known in the field of the art (e.g., U.S. Pat. No. 7,553,525).

The photo-isomerization-reactive diazo compound interacts differently with CNTs depending on the electronic properties of the CNTs. For further information on the affinity of the photo-isomerization-reactive diazo compound, see Melburne C, et al., "Self-sorted, aligned nanotube networks for thin film transistors," Science 2008. Vol. 321. 4 Jul. 2008, 101-104, 2009 American Association for the Advancement of Science, which is incorporated herein by reference in its entirety. For example, an aryl group in the aryl-terminated photo-isomerization-reactive diazo compound has high affinity for conducting CNTs. Thus, when the aryl-terminated photo-isomerization-reactive diazo compound is associated with the surface, a percentage of conducting CNTs associated with the surface is higher than that of semiconducting CNTs associated with the surface due to the higher affinity between the aryl group and the conducting CNTs. Thus, conducting enriched CNTs are associated with the surface modified with the aryl-terminated photo-isomerization-reactive diazo compound.

On the contrary, an amine group in the amine-terminated photo-isomerization-reactive diazo compound has higher affinity for semiconducting CNTs. Thus, when the amine-terminated photo-isomerization-reactive diazo compound is associated with the surface, a percentage of semiconducting CNTs associated with the surface is higher than that of conducting CNTs associated with the surface due to the high affinity between the amine group and the semiconducting CNTs. Accordingly, semiconducting enriched CNTs are associated with the surface modified with amine-terminated photo-isomerization-reactive diazo compound.

In some embodiments, the conducting enriched CNTs or semiconducting enriched CNTs associated with the surface can be detached by treating the surface with light. For example, UV energy can be provided to the modified surface. In some embodiments, the wavelength range of UV energy is approximately 10 to 400 nm. In another embodiment, the wavelength range of UV energy is approximately 250 to 380 nm, or approximately 330 to 380 nm. The strength of UV energy and irradiation time can be selected within the suitable range depending on the type and content of a photo-isomerization-reactive diazo compound, the thickness of the diazo compound layer, the amount of CNTs, or the like.

Figure 1A:
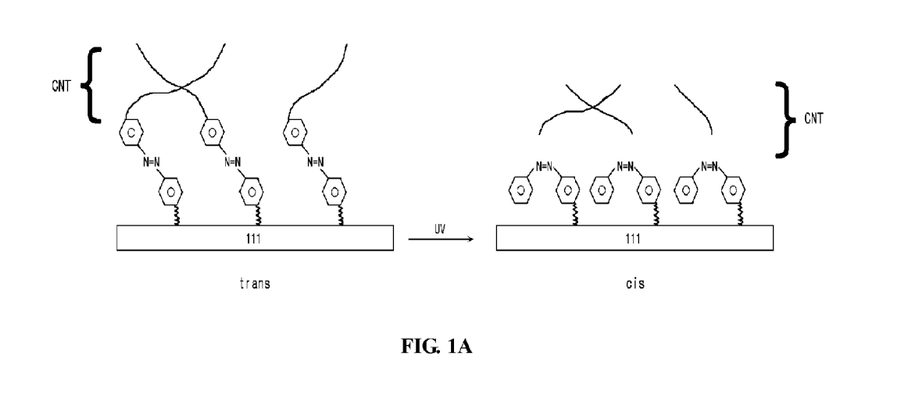
FIGS. 1A and 1B provide schematic diagrams illustrating transformation and regeneration mechanisms of an aryl-terminated photo-isomerization-reactive diazo compound in response to the irradiation of ultraviolet (UV) energy and visible light, respectively.
Figure 1B:
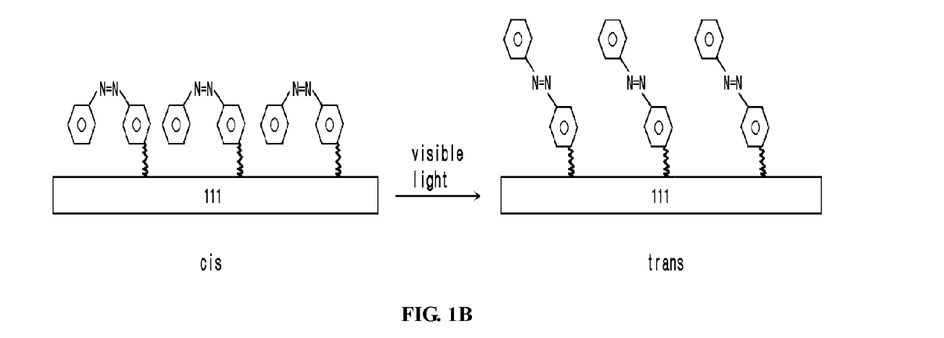

FIG. 1 shows schematic diagrams illustrating transformation and regeneration mechanisms of an aryl-terminated photo-isomerization-reactive diazo compound in response to the irradiation of UV energy FIG. 1A and visible light FIG. 1B, respectively. The reference numeral "111" indicates a substrate, and the reference numeral "112" indicates a photo-isomerization-reactive diazo compound layer associated with substrate 111, which will be described hereinafter.

As shown in FIG. 1A, the aryl terminated photo-isomerization-reactive diazo compound is transformed from a trans isomer to a cis isomer in response to UV energy.

Particularly, prior to exposure to UV energy, the aryl-terminated photo-isomerization-reactive diazo compound is a trans isomer, which is more stable than a cis isomer. Conducting CNTs readily associate with the terminal aryl group of the trans isomer of the aryl-terminated photo-isomerization-reactive diazo compound. Thus, conducting enriched CNTs are associated with the surface modified with the trans isomer of the aryl-terminated photo-isomerization-reactive diazo compound. However, in response to the irradiation of UV energy, a trans isomer of the aryl-terminated photo-isomerization-reactive diazo compound is transformed to a cis isomer in which the terminal aryl group is puckered toward the substrate 111. Thus, the conducting enriched CNTs are detached from the modified surface of substrate 111.

The transformation mechanism illustrated in FIG. 1A can be applied to the amine-terminated photo-isomerization-reactive diazo compound as well. For example, prior to the irradiation of UV energy, the amine-terminated photo-isomerization-reactive diazo compound is a trans isomer. Semiconducting CNTs readily associate with the terminal amine group of the trans isomer of the amine-terminated photo-isomerization-reactive diazo compound. Thus, semiconducting enriched CNTs are associated with the surface modified with the trans isomer of the amine-terminated photo-isomerization-reactive diazo compound. However, by treating the surface with exposure to UV energy, the trans isomer of the amine-terminated photo-isomerization-reactive diazo compound is transformed to a cis isomer, in which the terminal amine group is puckered toward substrate 111.

Accordingly, the semiconducting enriched CNTs are detached from the surface of substrate 111.

Hereinafter an illustrative embodiment of a method for sorting CNTs will be described in detail. A substrate including Si, Au, Ni, Cr, Cu, Al, Pt, Ti, W, Pd, Mo, metal oxides such as ITO, or glass is prepared. A surface of the substrate is modified with a trans isomer of photo-isomerization-reactive diazo compound by dip coating, spin coating, roll coating, rod bar coating, spray coating, air knife coating, slot die coating, wire bar coating or the like. The photo-isomerization-reactive diazo compound may include an amine-terminated photo-isomerization-reactive diazo compound or an aryl-terminated photo-isomerization-reactive diazo compound. Examples of the amine-terminated photo-isomerization-reactive diazo compound and the aryl-terminated photo-isomerization-reactive diazo compound are illustrated above.

In some embodiments, a dispersion containing a mixture of conducting CNTs and semiconducting CNTs is provided to a surface of a substrate. The surface can be modified with a trans isomer of the aryl-terminated or amine-terminated photo-isomerization-reactive diazo compound. Here, the mixture may contain the conducting CNTs and semiconducting CNTs in the same ratio. In another embodiment, the mixture may contain conducting enriched CNTs or semiconducting enriched CNTs.

A dispersion containing a mixture of conducting CNTs and semiconducting CNTs can be provided to a surface of a substrate using any method. In some embodiments, the surface of the substrate is immersed in a CNT mixture dispersion. In another embodiment, a CNT mixture dispersion is poured onto the surface of the substrate.

For example, when the surface is modified with the aryl-terminated photo-isomerization-reactive diazo compound, the aryl-terminated photo-isomerization-reactive diazo compound is a trans isomer prior to the irradiation of the UV energy. With the trans isomer of the aryl-terminated photo-isomerization-reactive diazo compound, CNTs are associated with the modified surface. Because the aryl group in the aryl-terminated photo-isomerization-reactive diazo compound has a high affinity with conducting CNTs, the CNTs associated with the modified surface are conducting enriched CNTs. Semiconducting enriched CNTs which are not associated with the modified surface are removed from the surface. The removal of CNTs can be performed by using any type of remover.

After providing to the modified surface a dispersion containing a mixture of conducting CNTs and semiconducting CNTs, the modified surface is allowed to dry, if necessary. The drying method is not limited to a particular method. In some embodiments, the modified surface can be placed vertically to dry. In another embodiment, the modified surface can be allowed to dry in air. In another embodiment, a drier can be used. The modified surface can be completely or partially dried, as long as semiconducting enriched CNTs, which are not associated with the modified surface, can be removed from the surface.

The conducting enriched CNTs can be detached from the surface of the substrate in response to the irradiation of the UV energy. Particularly, the trans isomer of the aryl-terminated photo-isomerization-reactive diazo compound is transformed to a cis isomer in response to the irradiation of the UV energy. The aryl group in the cis isomer of the aryl-terminated photo-isomerization-reactive diazo compound is puckered toward the substrate, thereby detaching the conducting enriched CNTs from the modified surface of the substrate.

The detached conducting enriched CNTs can be collected in a collector (not shown). The collector can be operably associated with a device for CNTs sorting by using a variety of well known sorting technologies. Because the collected CNTs may contain the semiconducting CNTs in addition to the conducting CNTs, the collected CNTs can be further treated to sort the conducting CNTs from the collection. For example, a dispersion containing the collected CNTs can be provided to another surface modified with a trans isomer of an aryl-terminated photo-isomerization-reactive diazo compound or the modified surface.

However, the modified surface that has been irradiated with the UV energy is not likely associated with the CNTs because the aryl-terminated photo-isomerization-reactive diazo compound has transformed to the cis isomer. Thus, in some embodiments, the modified surface that has been irradiated is further treated to be regenerated. For example, the modified surface that has been irradiated can be irradiated with visible light. In some embodiments, the wavelength range of visible light is approximately 400 to 700 nm, approximately 420 to 550 nm, or approximately 420 to 500 nm. The strength of visible light and irradiation time can be selected for a suitable range depending on the type and content of a photo-isomerization-reactive diazo compound, the thickness of the diazo compound layer, the amount of CNTs, or the like.

In response to the irradiation of the visible light, the cis isomer of the aryl-terminated photo-isomerization-reactive diazo compound is again transformed to the trans isomer, re-positioning the aryl group for another round of CNTs association.

FIG. 1B illustrates the regeneration mechanism of the modified surface. Here, the regenerated surface refers to the modified surface that has been irradiated with the UV light and the visible light in sequence.

A dispersion containing the collected conducting enriched CNTs can be provided to the regenerated surface. Due to the high affinity between the aryl group in the trans isomer of the aryl-terminated photo-isomerization-reactive diazo compound, conducting enriched CNTs are associated with the regenerated surface. Semiconducting enriched CNTs which are not associated with the modified surface are removed from the surface. The conducting enriched CNTs can be detached from the regenerated surface in response to the irradiation of the UV energy. The aryl-terminated photo-isomerization-reactive diazo compound associated with regenerated surface that has been irradiated is again transformed to the cis isomer. The cis isomer of the aryl-terminated photo-isomerization-reactive diazo compound can be re-transformed to the trans isomer with the irradiation of the visible light. Accordingly, providing to the surface modified with a trans isomer of the aryl-terminated photo-isomerization-reactive diazo compound a dispersion containing the collected CNTs, removing semiconducting enriched CNTs which are not associated with the modified surface from the surface, irradiation with the UV energy, and irradiation with the visible light can be repeated until a desired percentage by weight of the conducting CNTs is obtained.

In other embodiments, a dispersion containing another mixture of conducting CNTs and semiconducting CNTs can be provided to the regenerated surface. Through the processing of providing to the surface modified with a trans isomer of the aryl-terminated photo-isomerization-reactive diazo compound a dispersion containing the CNT mixture, removing semiconducting enriched CNTs which are not associated with the modified surface from the surface, irradiation with the UV energy, and irradiation with the visible light, conducting enriched CNTs can be continuously obtained on a commercial scale.

In some embodiments, amine-terminated photo-isomerization-reactive diazo compound can be used to modify the surface of the substrate. A dispersion containing a mixture of conducting CNTs and semiconducting CNTs is provided to the surface modified with the photo-isomerization-reactive diazo compound. Prior to the irradiation of the UV energy, semiconducting enriched CNTs are associated with the trans isomer of the amine-terminated photo-isomerization-reactive diazo compound of the modified surface. Conducting enriched CNTs which are not associated with the modified surface are removed from the surface. The trans isomer of the amine-terminated photo-isomerization-reactive diazo compound is transformed to a cis isomer in response to the irradiation of the UV energy. Thus, the semiconducting enriched CNTs can be detached from the modified surface in response to the irradiation of the UV energy. The detached semiconducting enriched CNTs can be collected in a collector (not shown).

In some embodiments, the modified surface that has been irradiated is further treated to be regenerated with visible light. In response to the irradiation of the visible light, the cis isomer of the amine-terminated photo-isomerization-reactive diazo compound is again transformed to the trans isomer, re-positioning the amine group for another round of CNTs association.

A dispersion containing the collected semiconducting enriched CNTs can be provided to the regenerated surface. Accordingly, the providing to the regenerated surface a dispersion containing the collected CNTs, removing conducting enriched CNTs which are not associated with the modified surface from the surface, irradiation with the UV energy, and irradiation with the visible light can be repeated until a desired percentage by weight of the semiconducting CNTs is obtained. In other embodiments, a dispersion containing another mixture of conducting CNTs and semiconducting CNTs can be provided to the regenerated surface. Through the processing of the providing to the regenerated surface a dispersion containing the mixture, removing conducting enriched CNTs which are not associated with the modified surface from the surface; irradiation with the UV energy, and irradiation with the visible light, semiconducting enriched CNTs can be continuously obtained on a commercial scale.

In another aspect, a device for CNT sorting is provided. An illustrative device for CNT sorting will be described in detail with reference to FIGS. 2 and 3.

Figure 2:
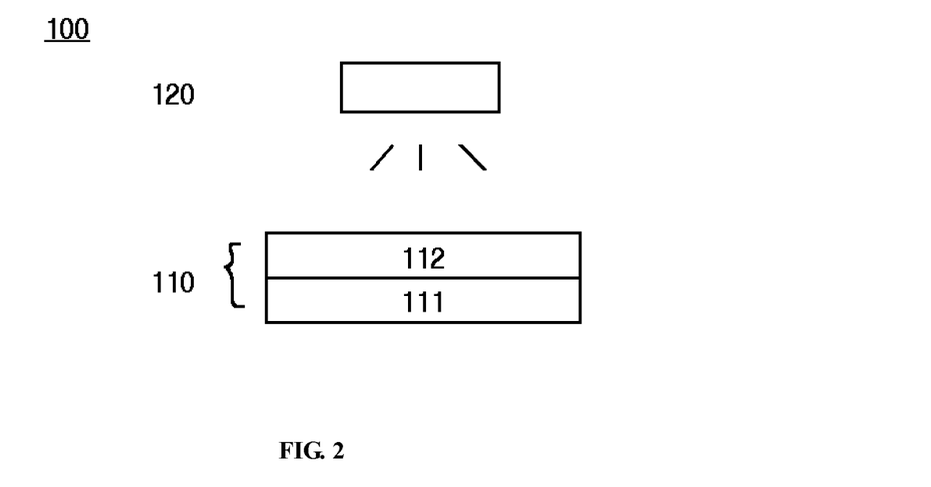
FIG. 2 is a schematic diagram of an illustrative embodiment of a device for CNT sorting.

FIG. 2 is a schematic diagram of an illustrative embodiment of a device for CNT sorting. As depicted in FIG. 2, a device for CNT sorting 100 includes a surface-modified substrate 110 and a radiating device 120 associated with surface-modified substrate 110. Surface-modified substrate 110 includes substrate 111 and photo-isomerization-reactive diazo compound layer 112. Substrate 111 can include, but is not limited to, Si, Au, Ni, Cr, Cu, Al, Pt, Ti, W, Pd, Mo, metal oxides, such as ITO, or glass. Photo-isomerization-reactive diazo compound layer 112 can include, but is not limited to, an amine-terminated photo-isomerization-reactive diazo compound or an aryl-terminated photo-isomerization-reactive diazo compound. Examples of the amine-terminated photo-isomerization-reactive diazo compound and examples of the aryl-terminated photo-isomerization-reactive diazo compound are illustrated in the above.

Figure 3:
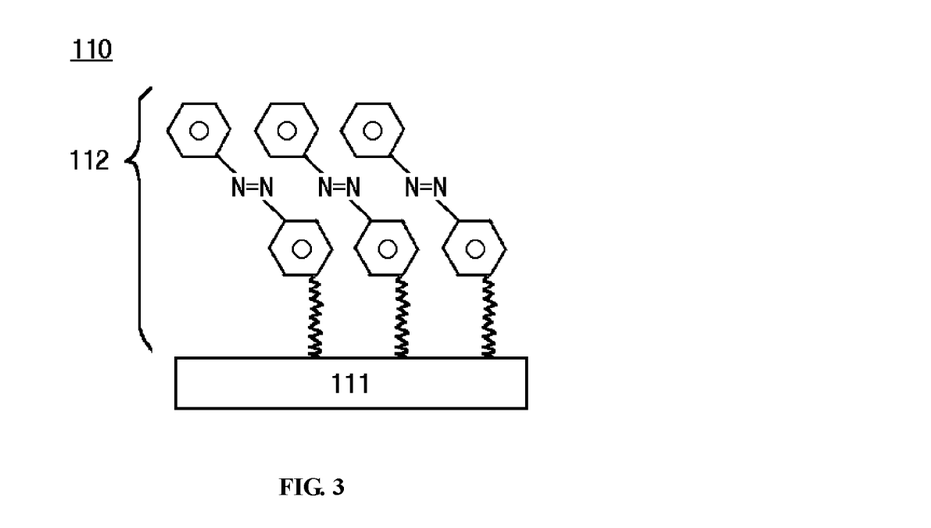
FIG. 3 is a schematic diagram of an illustrative embodiment of the surface-modified substrate shown in FIG. 2.

A surface of substrate 111 is associated with photo-isomerization-reactive diazo compound layer 112 as depicted in FIG. 3. FIG. 3 is a schematic diagram of an illustrative embodiment of the surface-modified substrate shown in FIG. 2. For example, photo-isomerization-reactive diazo compound is at least partially coated on the surface of substrate 111 by using of any of dip coating, spin coating, roll coating, rod bar coating, spray coating, air knife coating, slot die coating, wire bar coating or the like to form photo-isomerization-reactive diazo compound layer 112 on the surface of substrate 111.

A thickness of photo-isomerization-reactive diazo compound layer 112 can vary for different applications. For example, a thickness of photo-isomerization-reactive diazo compound layer 112 can vary according to a type of the photo-isomerization-reactive diazo compound included in layer 112, or the use of surface-modified substrate 110. In some embodiments, the thickness of photo-isomerization-reactive diazo compound layer 112 may have the range of 0.5 to 10 nm.

Radiating device 120 is associated with surface-modified substrate 110. Radiating device 120 provides variation of electromagnetic radiation's wavelength. In some embodiments, radiating device is a laser beam. Radiating device 120 can provide electromagnetic radiation of suitable wavelengths to a surface of surface-modified substrate 110. Radiating device 120 can provide UV energy. In some embodiments, the wavelength range of UV energy is 10 to 400 nm. In another embodiment, the wavelength range of UV energy is 250 to 380 nm, or 330 to 380 nm. Further, radiating device 120 can provide visible light. In some embodiments, the wavelength range of visible light is longer than 400 nm, or longer than 420 nm.

Radiating device 120 can be placed such that the electromagnetic radiation can be reached modified surface. For example, as illustrated in FIG. 2, radiating device 120 can be located in the upper middle section of surface-modified substrate 110. In some embodiments, a number of radiating devices can be located in the upper section of a surface-modified substrate, for example, in the case that the surface-modified substrate has a large area. Further, radiating device 120 can have different size or shape as long as it can irradiate the electromagnetic radiation to the modified surface of surface-modified substrate 110.

Radiating device 120 can provide one or more electromagnetic radiation to the modified surface of surface-modified substrate 110. In some embodiments, radiating device 120 provides a first electromagnetic radiation detaching associated CNTs from surface-modified substrate 110, and a second electromagnetic radiation regenerating surface-modified substrate 110 that has been irradiated with the first electromagnetic radiation. In other embodiments, device 100 may have two or more radiating device 120, one for illuminating the first electromagnetic radiation and the other for illuminating the second electromagnetic radiation. Radiating device 120 can be controlled to select irradiating one of the first and second electromagnetic radiations. The control can be performed automatically using computer programmed the irradiation cycle of the first electromagnetic radiation and the second electromagnetic radiation corresponding to the cycle of detaching CNTs from the modified surface and regenerating the modified surface. Further, the control can be performed manually corresponding to the cycle of detaching CNTs from the modified surface and regenerating the modified surface.

One example of the first electromagnetic radiation includes, but is not limited to, UV energy. In response to the irradiation of the first electromagnetic radiation, the compound included in photo-isomerization-reactive diazo compound layer 112 is transformed from trans isomer to cis isomer. Thus, associated CNTs can be detached from surface-modified substrate 110.

One example of the second electromagnetic radiation includes, but is not limited to, visible light. In response to the irradiation of the second electromagnetic radiation, the compound in photo-isomerization-reactive diazo compound layer 112 is transformed from the cis isomer to the trans isomer. Thus, the modified surface of surface-modified substrate 110 is regenerated such that CNTs can be associated with the regenerated surface.

In still another embodiment, device 100 may further include a container (not shown). The container is operably associated with the surface-modified substrate 110 and configured to hold a dispersion containing a CNT mixture which is provided to the substrate 110.

In still another embodiment, device 100 may further include a provider (not shown). The provider is operably associated with the surface-modified substrate 110 and configured to provide to the substrate a container holding a dispersion containing a mixture of conductive CNTs and semiconducting CNTs. In other embodiments, the provider can provide to the surface-modified substrate 110 a container holding a dispersion containing the conducting enriched CNTs or semiconducting enriched CNTs that have been detached from modified surface.

In still another embodiment, device 100 may further include a collector (not shown). The collector can collect the detached CNTs from a modified surface. The collector can be operably associated with the provider. For example, the detached CNTs from the modified surface can be collected through the collector, and then provided to the regenerated surface through the provider.

In still another embodiment, device 100 may further include a detector (not shown). The detector is operably associated with a collector. The detector can determine a purity of a collection of the detached CNTs. The detector can be operably associated with the provider. For example, when the detector determines that a purity of conducting enriched CNTs or semiconducting enriched CNTs is lower than a predetermined value, the conducting enriched CNTs or semiconducting enriched CNTs can be provided to the regenerated surface through the provider.

Figure 4:
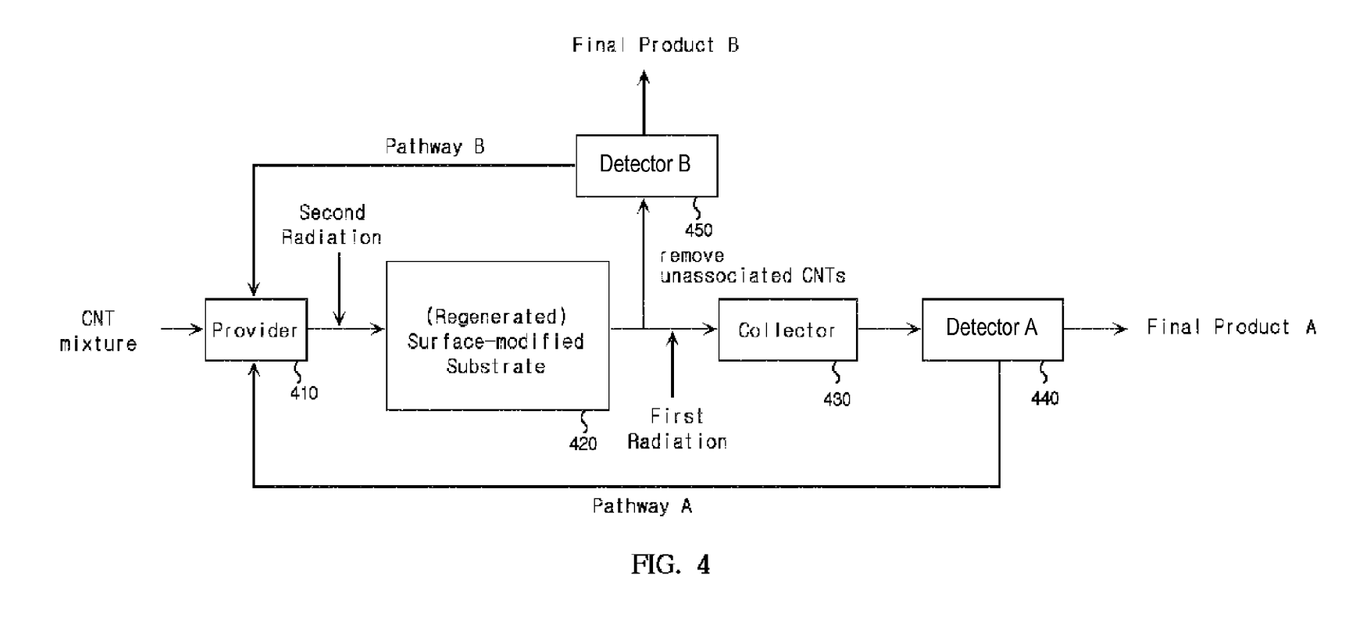
FIG. 4 is a schematic diagram illustrating the entire CNT sorting system.

FIG. 4 provides a schematic diagram illustrating the entire CNT sorting system. As shown in FIG. 4, a dispersion containing CNT mixture of conducting CNTs and semiconducting CNTs is provided to a surface-modified substrate 420 through a provider 410. According to the affinity between surface-modification compound and CNTs, conducting enriched or semiconducting enriched CNTs are associated with the modified surface. Semiconducting enriched or conducting enriched CNTs which are not associated with the modified surface are removed from the surface. After radiating the first electromagnetic radiation, conducting enriched or semiconducting enriched CNTs detached from the surface are collected in a collector 430. During passing through a detector A 440, a purity of the collected CNTs is detected. When the purity is identical to or greater than the predetermined value, the collected CNTs become a final product A. When the purity is lower than a predetermined value, the collected CNTs are provided to the modified surface through the provider 410 (Pathway A). The surface is regenerated by radiating of the second electromagnetic radiation before new CNT mixture or the collected CNTs is/are provided to the surface.

During the above Pathway A, CNTs which are not associated with the modified surface are removed from the surface. The removed CNTs are semiconducting enriched or conducting enriched CNTs (i.e., opposite composition to the collected CNTs). The removed CNTs go through Pathway B. During passing through a detector B 450, a purity of the removed CNTs is detected. When the purity is identical to or greater than the predetermined value, the collected CNTs become a final product B. When the purity is lower than a predetermined value, the removed CNTs are provided to the surface through the provider (Pathway B). The purity value of Pathway B can be predetermined to be the same as or different from the purity value of Pathway A.

In one embodiment, a dispersion containing a CNT mixture is provided to a surface of a substrate 420, the surface modified with a trans isomer of aryl-terminated photo-isomerization-reactive diazo compound, through a provider 410. According to the high affinity between aryl-terminated photo-isomerization-reactive diazo compound and conducting CNTs, conducting enriched CNTs are associated with the modified surface. Semiconducting enriched CNTs which are not associated with the modified surface are removed from the surface. After radiating UV energy as the first electromagnetic radiation, conducting enriched CNTs detached from the surface are collected in a collector 430. During passing through a detector A 440, a purity of the collected conducting enriched CNTs is detected. When the purity is identical to or greater than the predetermined value, the collected CNTs become a final product A. When the purity is lower than a predetermined value, the collected conducting enriched CNTs are provided to the surface through the provider 410 (Pathway A). The surface is regenerated by radiating of visible light as the second electromagnetic radiation before the collected conducting enriched CNTs are provided to the surface. The final product generated through the Pathway A is conducting enriched CNTs.

During the above Pathway A, semiconducting enriched CNTs which are not associated with the modified surface are removed from the surface. The removed semiconducting enriched CNTs go through Pathway B. During passing through a detector B 450, a purity of the removed semiconducting enriched CNTs is detected. When the purity is identical to or greater than the predetermined value, the collected CNTs become a final product B. When the purity is lower than a predetermined value, the removed semiconducting enriched CNTs are provided to the surface through the provider 410 (Pathway B). The final product generated through the Pathway B is semiconducting enriched CNTs.

In another embodiment, a dispersion containing a CNT mixture is provided to a surface of a substrate 420, the surface modified with a trans isomer of amine-terminated photo-isomerization-reactive diazo compound, through a provider 410. According to the high affinity between amine-terminated photo-isomerization-reactive diazo compound and semiconducting CNTs, semiconducting enriched CNTs are associated with the modified surface. Conducting enriched CNTs which are not associated with the modified surface are removed from the surface. After radiating UV energy as the first electromagnetic radiation, semiconducting enriched CNTs detached from the surface are collected in a collector 430. During passing through a detector A 440, a purity of the collected semiconducting enriched CNTs is detected. When the purity is identical to or greater than the predetermined value, the collected CNTs become a final product A. When the purity is lower than a predetermined value, the collected semiconducting enriched CNTs are provided to the surface through the provider 410 (Pathway A). The surface is regenerated by radiating of visible light as the second electromagnetic radiation before the collected semiconducting enriched CNTs are provided to the surface. The final product generated through the Pathway A is semiconducting enriched CNTs.

During the above Pathway A, conducting enriched CNTs which are not associated with the modified surface are removed from the surface. The removed conducting enriched CNTs go through Pathway B. During passing through a detector B 450, a purity of the removed conducting enriched CNTs is detected. When the purity is identical to or greater than the predetermined value, the collected CNTs become a final product B. When the purity is lower than a predetermined value, the removed conducting enriched CNTs are provided to the surface through the provider 410 (Pathway B). The final product generated through the Pathway B is conducting enriched CNTs.

The foregoing discloses embodiments using either a surface modified with amine-terminated photo-isomerization-reactive diazo compound or a surface modified with aryl-terminated photo-isomerization-reactive diazo compound. However, the present invention is not limited only to these embodiments. The sorting system may be designed to use both a surface modified with amine-terminated photo-isomerization-reactive diazo compound and a surface modified with aryl-terminated photo-isomerization-reactive diazo compound. For example, Pathways A and B may use a different substrate modified with different type of diazo compound. The sorting system may also be designed by using substrates modified with different diazo compounds respectively, in an alternative way or in an arrangement of various combinations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore; in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A device for sorting carbon nanotubes (CNTs), comprising:
   a surface-modified substrate including a substrate and a trans isomer of a photo-isomerization-reactive diazo compound layer configured to associate selectively with conducting enriched CNTs or semiconducting enriched CNTs;
   a radiating device associated with the surface-modified substrate and configured to provide a first electromagnetic radiation suitable to detach selected ones of the conducting enriched or semiconducting enriched CNTs associated with the modified surface from the modified surface; and
   a detector configured to determine a purity of selected ones of the enriched or semiconducting enriched CNTs that become detached from the modified surface responsive to the first electromagnetic radiation.

2. The device of claim 1, wherein the first electromagnetic radiation has a wavelength that falls within the ultraviolet (UV) wavelength range.

3. The device of claim 1, wherein the radiating device is further configured to provide a second electromagnetic radiation, with a wavelength different than that of the first electromagnetic radiation, to the modified surface.

4. The device of claim 3, wherein the second electromagnetic radiation has a wavelength that falls within the visible wavelength range.

5. The device of claim 1, wherein the photo-isomerization-reactive diazo compound comprises at least one of an amine-terminated photo-isomerization-reactive diazo compound or an aryl-terminated photo-isomerization-reactive diazo compound.

6. The device of claim 1, wherein the trans isomer of a photo-isomerization-reactive diazo compound layer has a thickness within a range of about 0.5 nm to about 10 nm.

7. The device of claim 1, further comprising:
   a CNT provider operably associated with the surface-modified substrate; and
   wherein the CNT provider is configured to provide, to the modified surface, a dispersion including a mixture of conductive CNTs and semiconducting CNTs or the conducting or semiconducting enriched CNTs that have been detached from the modified surface.

8. A device for sorting carbon nanotubes (CNTs), comprising:
   a surface-modified substrate including a substrate and a trans isomer of a photo-isomerization-reactive diazo compound layer configured to associate selectively with conducting enriched CNTs or semiconducting enriched CNTs;
   a radiating device associated with the surface-modified substrate and configured to provide a first electromagnetic radiation suitable to detach selected ones of the conducting enriched or semiconducting enriched CNTs associated with the modified surface from the modified surface and a second electromagnetic radiation suitable to regenerate the modified surface;
   a controller associated with the radiating device and configured to direct the radiating device to irradiate the modified surface with at least one of the first electromagnetic radiation or the second electromagnetic radiation; and
   a collector configured to collect selected ones of the conducting enriched or semiconducting enriched CNTs that become detached from the modified surface responsive to the first electromagnetic radiation.

9. The device of claim 8, further comprising a container associated with the surface-modified substrate and configured to hold a dispersion containing a CNT mixture to be provided to the surface-modified substrate.

10. The device of claim 8, further comprising a CNT provider operably coupled to the controller, the CNT provider configured to provide to the surface-modified substrate a dispersion containing a mixture including conductive enriched CNTs and semiconducting enriched CNTs.

11. The device of claim 8, further comprising a CNT provider operably coupled to the controller, the CNT provider configured to provide the surface-modified substrate a container holding a dispersion including the conducting enriched CNTs or semiconducting enriched CNTs that have been detached from the modified surface.

12. The device of claim 8, further comprising:
   a detector operatively associated with the collector, the detector configured to determine a purity of selected ones of the enriched or semiconducting enriched CNTs that become detached from the modified surface responsive to the first electromagnetic radiation.

13. The device of claim 12, further comprising:
   wherein the detector is configured to determine if a purity of selected ones of the enriched or semiconducting enriched CNTs that become detached from the modified surface responsive to the first electromagnetic radiation falls below a predetermined value; and
   a CNT provider operably associated with the detector, the CNT provider configured to provide to the surface-modified substrate a dispersion including a mixture of at least one of conductive enriched CNTs or semiconducting enriched CNTs responsive to the detector determining the predetermined value.

14. The device of claim 8, wherein the photo-isomerization-reactive diazo compound comprises at least one of an amine-terminated photo-isomerization-reactive diazo compound or an aryl-terminated photo-isomerization-reactive diazo compound.

15. The device of claim 8, wherein the first electromagnetic radiation has a wavelength that falls within the ultraviolet (UV) wavelength range.

16. The device of claim 8, wherein the second electromagnetic radiation has a wavelength that falls within visible wavelength range.

17. The device of claim 8, wherein the trans isomer of a photo-isomerization-reactive diazo compound layer has a thickness within a range of about 0.5 nm to about 10 nm.

18. A device for sorting carbon nanotubes (CNTs), comprising:
   a surface-modified substrate including a substrate and an aryl-terminated photo-isomerization reactive diazo compound;
   a CNT provider configured to provide to the surface-modified substrate a dispersion containing a CNT mixture;
   one or more radiating devices associated with the surface-modified substrate and configured to provide a first electromagnetic radiation effective to detach selected ones of the conducting enriched or semiconducting enriched CNTs associated with the modified surface from the modified surface and a second electromagnetic radiation effective to regenerate the surface-modified substrate;

a controller configured to direct the one or more radiating devices to selectively irradiate the surface-modified substrate with at least one of the first electromagnetic radiation or the second electromagnetic radiation;

a collector configured to collect selected ones of the conducting enriched or semiconducting enriched that become detached from the modified surface responsive to the at least one of the first electromagnetic radiation or the second electromagnetic radiation; and a detector associated with the collector and configured to determine a purity of selected ones of the conducting enriched or semiconducting enriched CNTs collected by the collector, the detector configured to communicate with the provider responsive to the purity being detected to fall below a predetermined value.

* * * * *

UNITED STATES PATENT AND TRADEMARK OFFICE
CERTIFICATE OF CORRECTION

PATENT NO. : 8,470,256 B2
APPLICATION NO. : 13/495266
DATED : June 25, 2013
INVENTOR(S) : Lee It is certified that error appears in the above-identified patent and that said Letters Patent is hereby corrected as shown below:

On the title page, item (56), under "OTHER PUBLICATIONS", in Column 2, Line 1, delete "al," and insert -- al., --, therefor.

On the title page, item (56), under "OTHER PUBLICATIONS", in Column 2, Line 3, delete "Letters" and insert -- Letters, --, therefor.

On the title page, item (56), under "OTHER PUBLICATIONS", in Column 2, Line 4, delete "al," and insert -- al., --, therefor.

On the title page, item (56), under "OTHER PUBLICATIONS", in Column 2, Line 11, delete "al," and insert -- al., --, therefor.

On title page 2, item (56), under "OTHER PUBLICATIONS", in Column 1, Line 1, delete "al," and insert -- al., --, therefor.

On title page 2, item (56), under "OTHER PUBLICATIONS", in Column 1, Line 3, delete "glycidoxyproplytrimethoxysilane" and insert -- glycidoxypropyltrimethoxysilane --, therefor.

On title page 2, item (56), under "OTHER PUBLICATIONS", in Column 1, Line 5, delete "al," and insert -- al., --, therefor.

On title page 2, item (56), under "OTHER PUBLICATIONS", in Column 1, Line 8, delete "al" and insert -- al., --, therefor.

On title page 2, item (56), under "OTHER PUBLICATIONS", in Column 1, Line 25, delete "Z," and insert -- Z., --, therefor.

On title page 2, item (56), under "OTHER PUBLICATIONS", in Column 2, Line 11, delete "al," and insert -- al., --, therefor.

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,470,256 B2

In the Specification

In Column 3, Line 66, delete "thereof;" and insert -- thereof, --, therefor.

In Column 5, Line 13, delete "can be," and insert -- can be --, therefor.

In Column 5, Line 56, delete "C," and insert -- C., --, therefor.

In Column 5, Line 57, delete "2008. Vol. 321." and insert -- 2008, Vol. 321, --, therefor.

In Column 14, Line 53, delete "thereof" and insert -- thereof. --, therefor.

In the Claims

In Column 16, Line 60, in Claim 18, delete "photo-isomerization reactive" and insert -- photo-isomerization-reactive --, therefor.